United States Patent
Song

(10) Patent No.: US 11,030,987 B2
(45) Date of Patent: Jun. 8, 2021

(54) METHOD FOR SELECTING BACKGROUND MUSIC AND CAPTURING VIDEO, DEVICE, TERMINAL APPARATUS, AND MEDIUM

(71) Applicant: BEIJING MICROLIVE VISION TECHNOLOGY CO., LTD, Beijing (CN)

(72) Inventor: Yu Song, Beijing (CN)

(73) Assignee: Beijing Microlive Vision Technology Co., Ltd., Beijing (CN)

( * ) Notice: Subject to any disclaimer, the term of this patent is extended or adjusted under 35 U.S.C. 154(b) by 0 days.

(21) Appl. No.: 17/017,013

(22) Filed: Sep. 10, 2020

(65) Prior Publication Data
US 2021/0012761 A1 Jan. 14, 2021

Related U.S. Application Data

(63) Continuation of application No. PCT/CN2018/124770, filed on Dec. 28, 2018.

(30) Foreign Application Priority Data

Jul. 12, 2018 (CN) .......................... 201810765863.6

(51) Int. Cl.
*G10H 1/36* (2006.01)
*G06F 16/683* (2019.01)
(Continued)

(52) U.S. Cl.
CPC .......... *G10H 1/366* (2013.01); *G06F 16/683* (2019.01); *G06F 16/686* (2019.01);
(Continued)

(58) Field of Classification Search
CPC ...... G10H 1/366; G10H 1/368; G10H 1/0033; G10H 1/0025; G06F 16/683; G06F 16/686
See application file for complete search history.

(56) References Cited

U.S. PATENT DOCUMENTS 9,535,654 B2 * 1/2017 Farshi ..................... G11B 27/10
2007/0292106 A1 * 12/2007 Finkelstein ............ G11B 27/28
386/241
(Continued)

FOREIGN PATENT DOCUMENTS

CN 102348086 A 2/2012
CN 105681676 A 6/2016
(Continued)

OTHER PUBLICATIONS

International Search Report and Written Opinion dated Apr. 1, 2019 for PCT Patent Application PCT/CN2018/124770.
(Continued)

*Primary Examiner* — Jeffrey Donels
(74) *Attorney, Agent, or Firm* — Thomas Horstemeyer LLP

(57) ABSTRACT

Disclosed are a method for selecting background music and capturing a video, a device, a terminal apparatus, and a medium. The method includes: a music viewing instruction is acquired in a process of playing a video; a music detail corresponding to a background music fragment used by the video is displayed according to the music viewing instruction; a same-style capturing instruction is acquired, and a starting point of the background music fragment in a whole piece of music is acquired according to the same-style capturing instruction; a capturing instruction is acquired, and a video capturing is performed on a target scene according to the capturing instruction until a capturing stop instruction is acquired, and a corresponding video is acquired; and a corresponding music fragment is acquired, so the music fragment and the acquired video are synthesized to obtain a target video.

20 Claims, 21 Drawing Sheets

(51) Int. Cl.
*G06F 16/68* (2019.01)
*G10H 1/00* (2006.01)

(52) U.S. Cl.
CPC ......... *G10H 1/0025* (2013.01); *G10H 1/0033* (2013.01); *G10H 1/368* (2013.01)

(56) References Cited

U.S. PATENT DOCUMENTS

| | | | | |
|---|---|---|---|---|
| 2010/0170382 | A1* | 7/2010 | Kobayashi | G10H 1/38 84/613 |
| 2012/0076310 | A1* | 3/2012 | DeBusk | G10L 25/48 381/56 |
| 2014/0214190 | A1* | 7/2014 | Wang | G10L 25/48 700/94 |
| 2016/0336039 | A1* | 11/2016 | Leiberman | G11B 27/34 |
| 2017/0236551 | A1* | 8/2017 | Leiberman | H04N 21/4394 386/285 |

FOREIGN PATENT DOCUMENTS

| | | |
|---|---|---|
| CN | 106131475 A | 11/2016 |
| CN | 106375782 A | 2/2017 |
| CN | 106851385 A | 6/2017 |
| CN | 106911900 A | 6/2017 |
| CN | 107959873 A | 4/2018 |
| CN | 108055490 A | 5/2018 |
| CN | 108600825 A | 9/2018 |
| CN | 108668164 A | 10/2018 |
| JP | 2004200811 A | 7/2004 |

OTHER PUBLICATIONS

1st Search Report dated Mar. 13, 2019 for Chinese Patent Application No. 201810765863.6.
1st Office Action dated Mar. 25, 2019 for Chinese Patent Application No. 201810765863.6.

* cited by examiner

METHOD FOR SELECTING BACKGROUND MUSIC AND CAPTURING VIDEO, DEVICE, TERMINAL APPARATUS, AND MEDIUM

CROSS REFERENCE TO RELATED APPLICATIONS

This is continuation of International Patent Application No. PCT/CN2018/124770, filed on Dec. 28, 2018, which is based on and claims the priority of a Chinese patent application No. 201810765863.6 filed with the CNIPA on Jul. 12, 2018, disclosures of which are incorporated herein by reference in their entireties.

TECHNICAL FIELD

Embodiments of the present disclosure relate to the technical field of video capturing, and for example, to a method for selecting background music and capturing a video, a device, a terminal apparatus, and a medium.

BACKGROUND

When a user watches a video, the user may like background music of a certain video, and wants to use this background music to capture an own video.

However, in the related art, the background music is directly synthesized in the captured video after being selected by the capturing user, the user who watches the video cannot know any information about the background music, including a name, a singer and the like, and may only manually search or ask others, so that the acquisition efficiency of music information is very low, and favorite background music cannot be used in the captured video, which affects the user experience.

SUMMARY

The present disclosure provides a method for selecting background music and capturing a video, a device, a terminal apparatus, and a medium, so that a user may capture a video by adopting a same-style music fragment used by a current video, the acquisition efficiency of music information is improved, and the user experience is improved.

The present disclosure provides a method for selecting background music and capturing a video. The method includes steps described below, a music viewing instruction is acquired in a process of playing a video; a music detail corresponding to a background music fragment used by the played video is displayed according to the music viewing instruction; a same-style capturing instruction is acquired, and a starting point of the background music fragment in a whole piece of music is acquired according to the same-style capturing instruction; a capturing instruction is acquired, a video capturing is performed on a target scene according to the capturing instruction until a capturing stop instruction is acquired, and a corresponding video is acquired; and a synthesis instruction is acquired, it is selected from the whole piece of music according to the starting point to acquire a corresponding music fragment, and the music fragment and the acquired video are synthesized to obtain a target video.

The present disclosure provides a method for selecting background music and capturing a video. The method includes steps described below, when a trigger operation on a music control on a video playing interface is detected, it is jumped to a music detail interface, and a same-style capturing control is displayed on the music detail interface; when a trigger operation on the same-style capturing control is detected, a starting point of a background music fragment which is in a whole piece of music and used by a video on the video playing interface is acquired, the terminal apparatus jumps to a video capturing interface, and a capturing control and a synthesis control are displayed on the video capturing interface; when a trigger operation on the capturing control is detected, a target scene is displayed on the video capturing interface and a capturing stop control is displayed, and a corresponding video is stored until a trigger operation on the capturing stop control is detected; and when a trigger operation on the synthesis control is detected, it is selected from the whole piece of music according to the starting point to acquire a corresponding music fragment, the terminal apparatus jumps to a video viewing interface, and a result of synthesizing the music fragment and the stored video to obtain a target video is displayed.

The present disclosure provides a device for selecting background music and capturing a video. The device includes an acquisition module, a music detail display module, a music start acquisition module, a capturing module and a synthesis module. The acquisition module is configured to acquire a music viewing instruction in a process of playing a video. The music detail display module is configured to display a music detail corresponding to a background music fragment used by the played video according to the music viewing instruction. The music start acquisition module is configured to acquire a same-style capturing instruction, and acquire a starting point of the background music fragment in a whole piece of music according to the same-style capturing instruction. The a capturing module is configured to acquire a capturing instruction, perform a video capturing on a target scene according to the capturing instruction until a capturing stop instruction is acquired, and acquire a corresponding video. The synthesis module is configured to acquire a synthesis instruction, select from the whole piece of music according to the starting point to acquire a corresponding music fragment, and synthesize the music fragment and the acquired video to obtain a target video.

The present disclosure provides a device for selecting background music and capturing a video. The device includes a detection module and a processing module. The detection module is configured to detect a trigger operation on a music control on a video playing interface. The processing module is configured to jump to a music detail interface, and display a same-style capturing control on the music detail interface. The detection module is further configured to detect a trigger operation on the same-style capturing control. The processing module is further configured to acquire a starting point of a background music fragment which is in a whole piece of music and used by a video on the video playing interface, jump to a video capturing interface, and display a capturing control and a synthesis control on the video capturing interface. The detection module is further configured to detect a trigger operation on the capturing control. The processing module is further configured to display a target scene on the video capturing interface and display a capturing stop control, and store a corresponding video until a trigger operation on the capturing stop control is detected. The detection module is further configured to detect a trigger operation on the synthesis control. The processing module is further configured to select from the whole piece of music according to the starting point to acquire a corresponding music fragment, jump to a video viewing interface, and display a result of synthesizing the music fragment and the stored video to obtain a target video.

The present disclosure provides a terminal apparatus. The terminal apparatus includes a memory, a controller, and a program stored on the memory and executable on the controller. The terminal apparatus further includes a camera configured to collect a video. The controller, when executing the program, implements any one of the above-described methods for selecting the background music and capturing the video.

The present disclosure provides a storage medium. The storage medium contains an executable instruction which, when executed by a controller, performs any one of the above-described methods for selecting the background music and capturing the video.

According to the embodiments of the present disclosure, the music control provided on the video playing interface may be triggered to enter the music detail interface, the starting point of the background music fragment which is in the whole piece of music and used by the video on the video playing interface is acquired, after the same-style capturing instruction is acquired on the music detail interface, the video capturing may be performed, and after the video capturing is completed, the corresponding music fragment is acquired according to the starting point, and the music fragment and the captured video are synthesized to obtain the target video, so that the user can conveniently capture a video by adopting the same-style music fragment used by the video on the video playing interface, the acquisition efficiency of the music information is improved, and thus the user experience is improved.

DETAILED DESCRIPTION

Figure 1:
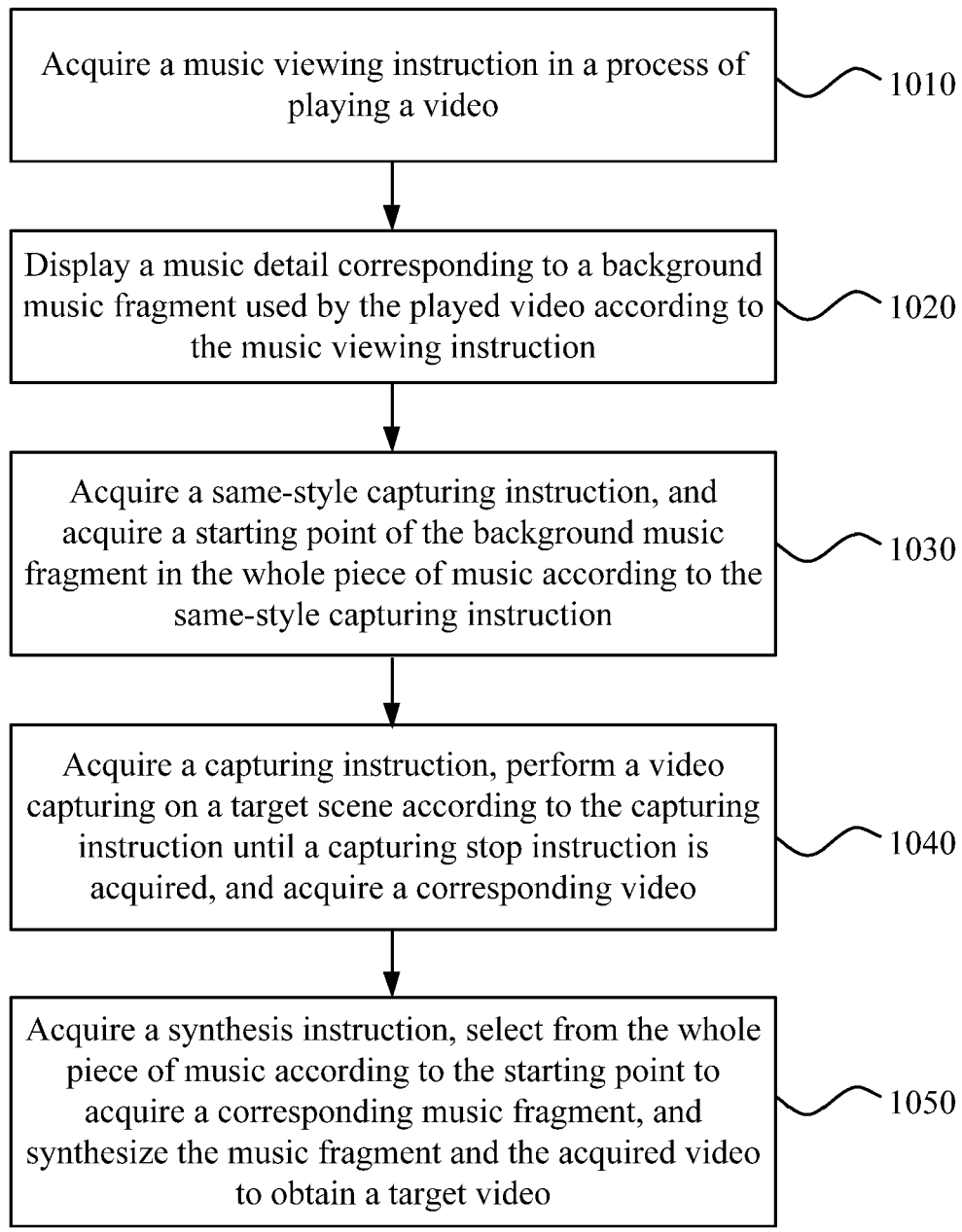
FIG. 1 is a flowchart of a method for selecting background music and capturing a video provided by an embodiment of the present disclosure.

Embodiments of the present disclosure will be described in conjunction with the drawings and embodiments below. The embodiments described herein are merely used for explaining the embodiments of the present disclosure and are not intended to limit the embodiments of the present disclosure. In addition, for ease of description, only a part, but not all, of structures related to the embodiments of the present disclosure are shown in the drawings.

FIG. 1 is a flowchart of a method for selecting background music and capturing a video provided by an embodiment of the present disclosure. The method may be executed by a terminal apparatus. The method provided in this embodiment includes following steps.

In step 1010, a music viewing instruction is acquired in a process of playing a video.

In a process of watching a video by using a terminal apparatus, a user sometimes likes a background music fragment used by the video, and wants to use this background music fragment to capture his/her own video. In this embodiment, the user may trigger a music control on a video playing interface to generate a music viewing instruction. The music control includes two forms, one is a control with a shape of an optical disc and displayed on the video playing interface, and the other is a rolling music name displayed on the video playing interface. The user may trigger the generation of the music viewing instruction by triggering either the optical disc or the music name.

In step 1020, a music detail corresponding to the background music fragment used by the played video is displayed according to the music viewing instruction.

The music detail is some relevant information about a whole piece of music to which the background music fragment used by the played video belongs, including a music name, an original musician identifier, and a cover of a video captured by using the background music fragment. In this embodiment, after the user triggers the music control on the video playing interface, the terminal apparatus jumps to a music detail interface, and information such as the music name, the original musician identifier and the cover of the video captured by using the background music fragment is displayed on this interface. The user may know from the music detail interface the music detail corresponding to the background music fragment which the user wants to use.

In step 1030, a same-style capturing instruction is acquired, and a starting point of the background music fragment in the whole piece of music is acquired according to the same-style capturing instruction.

The terminal apparatus displays a same-style capturing control on the music detail interface, the user triggers this control to generate the same-style capturing instruction. At this time, the terminal apparatus acquires the starting point of the background music fragment in the whole piece of music according to the same-style capturing instruction. In this embodiment, there are two implementation manners for acquiring the starting point, i.e., if the starting point of the background music fragment in the whole piece of music is reserved in background music fragment information stored in the played video, the starting point may be directly obtained from the background music fragment information; and if the starting point of the background music fragment in the whole piece of music is not reserved in the background music fragment information stored in the played video, the starting point of the background music fragment in the whole piece of music may be determined through an acoustic spectrum comparison. An acoustic spectrum is a tool used for describing a distribution pattern of acoustic energy in components and timbres contained in sound. The acoustic spectrum may be regarded as "a photograph of sound" and may reflect a relationship between frequency and amplitude of the sound at one instance of a sounding process, the abscissa of the acoustic spectrum is the frequency, and the ordinate of the sound spectrum is the amplitude. The acoustic spectrum comparison includes that spectrograms of the background music fragment and the whole piece of music are respectively generated first, then these two spectrograms are compared to find an overlap area of them, and a starting position of the overlap area is determined as the starting point.

In step 1040, a capturing instruction is acquired, a video capturing is performed on a target scene according to the capturing instruction until a capturing stop instruction is acquired, and a corresponding video is acquired.

After the same-style capturing instruction is acquired by the terminal apparatus, the terminal apparatus not only performs the operation of acquiring the starting point in the step 1030, but also jumps to a video capturing interface on which a capturing control is displayed, and the user triggers this control to generate the capturing instruction. The terminal apparatus displays the target scene and displays a capturing stop control, the target scene includes all scenes within a coverage range of a camera of the terminal apparatus. The capturing stop instruction is an instruction generated by the user triggering the capturing stop control. After the capturing instruction is acquired, the terminal apparatus starts to capture the target scene until the capturing stop instruction is acquired, then the terminal apparatus stops capturing, and acquires a video captured between the capturing instruction and the capturing stop instruction.

In step 1050, a synthesis instruction is acquired, it is selected from the whole piece of music according to the starting point to acquire a corresponding music fragment, and the music fragment and the acquired video are synthesized to obtain a target video.

The terminal apparatus further displays a synthesis control on the video capturing interface, and the user triggers this control to generate the synthesis instruction. In this embodiment, after the synthesis instruction is acquired by the terminal apparatus, the corresponding music fragment is acquired first by selecting from the whole piece of music according to the starting point, and then the music fragment and the captured video are synthesized to obtain the target video.

In an embodiment, the step in which it is selected from the whole piece of music according to the starting point to acquire the corresponding music fragment includes a step described below, starting from the starting point, a music fragment with a same duration as the acquired video is selected from the whole piece of music.

In this embodiment, the terminal apparatus acquires the music viewing instruction to display the music detail corresponding to the background music fragment used by the video, and then acquires the same-style capturing instruction, so that the user may capture his/her own video by using the same background music fragment. The user may conveniently use a favorite music fragment as background music in a video captured by himself/herself through respective operations.

A video sharing software on a smart phone is taken as an example for explanation below. For example, a user clicks an icon of this video sharing software on a display screen of the smart phone so as to initiate the application program of this video sharing software and enter a video playing interface. The video playing interface includes a music control. If the user triggers this music control, then the smart phone jumps to a music detail interface. The music detail interface includes not only a music name, an original musician identifier and a cover of a video captured by using the background music, but also a same-style capturing control. If the user triggers the same-style capturing control, then a starting point of a background music fragment which is in a whole piece of music and used by a video on the video playing interface is acquired, and the smart phone jumps to a video capturing interface. The video capturing interface includes a capturing control and a synthesis control. If the user triggers the capturing control, then a camera of the terminal apparatus begins to perform a video capturing on a target scene, and the terminal apparatus displays the target scene and a capturing stop control on the video capturing interface. If the user triggers the capturing stop control, then the video capturing is ended, and a corresponding video is obtained. If the user triggers the synthesis control, then a corresponding music fragment is acquired by selecting from the whole piece of music according to the starting point, and the music fragment and the captured video are synthesized to obtain a target video.

In the technical scheme of this embodiment, the music control provided on the video playing interface may be triggered to enter the music detail interface, and the starting point of the background music fragment which is in the whole piece of music and used by the video on the video playing interface is acquired, after the same-style capturing instruction is acquired on the music detail interface, the video capturing may be performed, and after the video capturing is completed, the corresponding music fragment is acquired according to the starting point, and the music fragment and the captured video are synthesized to obtain the target video, so that the user can conveniently capture a video by adopting the same-style music fragment used by the video on the video playing interface, the acquisition efficiency of the music information is improved, and thus the user experience is improved.

On the basis of the above-described technical scheme, after the music fragment and the video are synthesized to obtain the target video, the method further includes steps described below, a music clipping instruction is acquired; and the starting point in the whole piece of music is changed according to the music clipping instruction, it is re-selected from the whole piece of music according to the changed starting point to acquire the corresponding music fragment, and the re-selected music fragment and the acquired video are re-synthesized to obtain the target video.

In order to provide the user with a more flexible way to edit the background music, the terminal apparatus may display the music clipping control on the video viewing interface after the target video is synthesized, the user triggers this control to generate the music clipping instruction, and the terminal apparatus may change the starting point in the whole piece of music according to this instruction, and re-select from the whole piece of music according to the changed starting point to acquire the corresponding music fragment, so the re-selected music fragment and the acquired video are re-synthesized to obtain the target video. In this way, the user may directly adopt the background music fragment of other users, and also re-select the starting point of the whole piece of music to which the background music fragment belongs, so as to re-select the favorite music fragment and synthesize it into the video captured by himself/herself.

Figure 2:
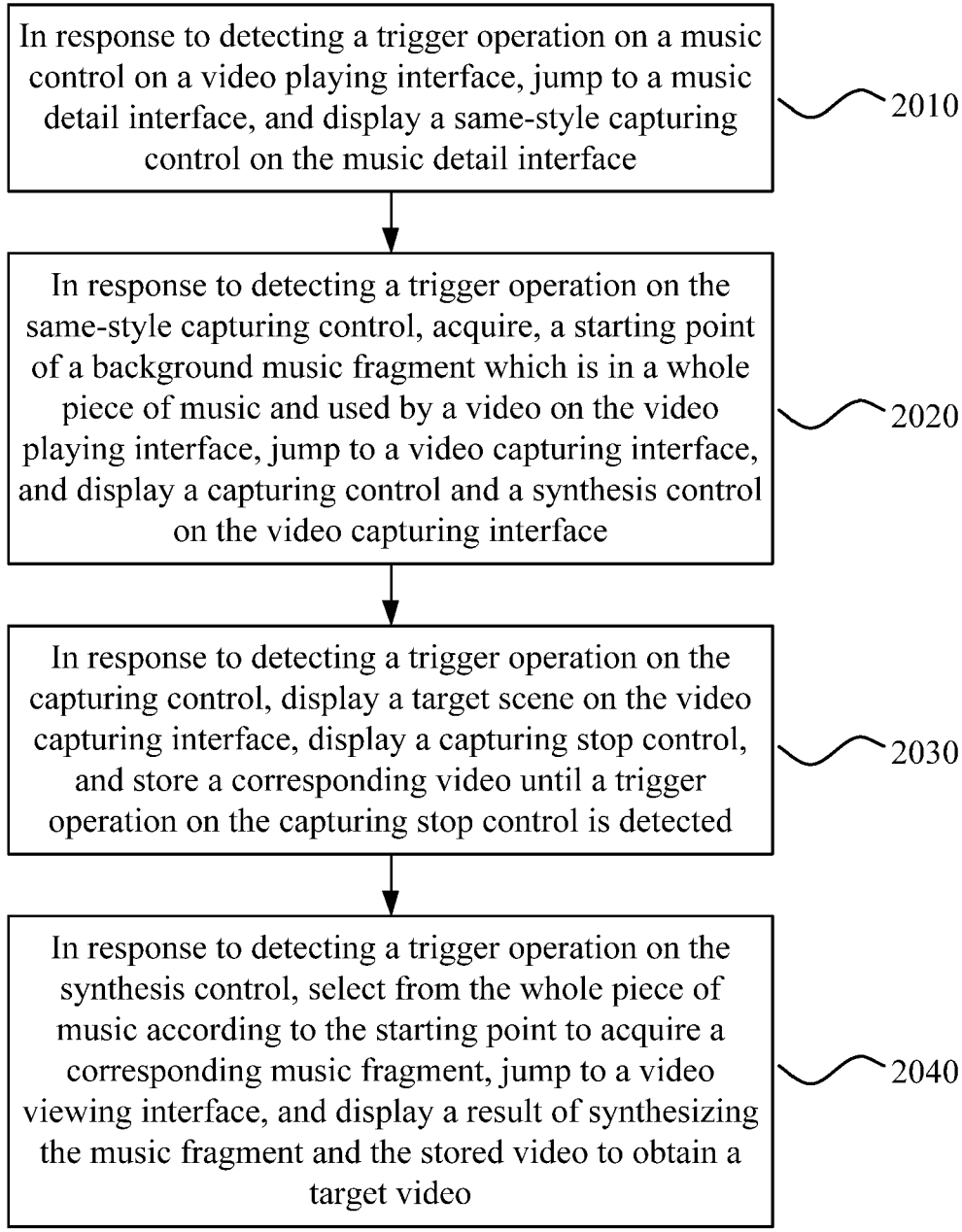
FIG. 2 is a flowchart of another method for selecting background music and capturing a video provided by an embodiment of the present disclosure.

FIG. 2 is a flowchart of another method for selecting background music and capturing a video provided by an embodiment of the present disclosure. The method may be executed by a terminal apparatus. The method provided in this embodiment includes following steps.

In step 2010, when a trigger operation on a music control on a video playing interface is detected, it is jumped to a music detail interface, and a same-style capturing control is displayed on the music detail interface.

In step 2020, when a trigger operation on the same-style capturing control is detected, a starting point of a background music fragment which is in a whole piece of music and used by a video on the video playing interface is acquired, it is jumped to a video capturing interface, and both a capturing control and a synthesis control are displayed on the video capturing interface.

In step 2030, when a trigger operation on the capturing control is detected, a target scene and a capturing stop control are displayed on the video capturing interface, and a corresponding video is stored until a trigger operation on the capturing stop control is detected.

In step 2040, when a trigger operation on the synthesis control is detected, it is selected from the whole piece of music according to the starting point to acquire a corresponding music fragment, it is jumped to the video viewing interface, and a result of synthesizing the music fragment and the stored video to obtain a target video is displayed.

In the embodiments of the present disclosure, a user clicks an icon of this video sharing software on a display screen of the smart phone so as to initiate the application program of this video sharing software and enter a video playing interface. The video playing interface includes a music control. If the user triggers the music control, then the smart phone jumps to a music detail interface. The music detail interface includes not only a music name, an original musician identifier and a cover of a video captured by using the background music, but also a same-style capturing control. If the user triggers the same-style capturing control, then a starting point of a background music fragment which is in the whole piece of music and used by a video on the video playing interface is acquired, and the smart phone jumps to a video capturing interface. The video capturing interface includes a capturing control and a synthesis control. If the user triggers the capturing control, then a camera of the terminal apparatus begins to perform a video capturing on a target scene, and the terminal apparatus displays the target scene and a capturing stop control on the video capturing interface. If the user triggers the capturing stop control, then the video capturing is ended, and a corresponding video is obtained. If the user triggers the synthesis control, then a corresponding music fragment is acquired by selecting from the whole piece of music according to the starting point, and the smart phone jumps to the video viewing interface, and the result of synthesizing the music fragment and the stored video to obtain the target video is displayed.

On the basis of the above-described technical scheme, after jumped to the video viewing interface, and the result of synthesizing the music fragment and the stored video to obtain the target video is displayed, the method further includes steps described below, a music clipping control is displayed on the video viewing interface; when a trigger operation on the music clipping control is detected, a music progress bar is displayed on the video viewing interface; when a dragging operation on the music progress bar is detected, the starting point in the whole piece of music is changed, the corresponding music fragment is acquired by re-selecting from the whole piece of music according to the changed starting point, and a result of re-synthesizing the re-selected music fragment and the stored video to obtain the target video is displayed on the video viewing interface.

In order to provide the user with a more flexible way to edit the background music, the terminal apparatus may display the music clipping control on the video playing interface after the target video is synthesized, the user triggers this control to generate a music clipping instruction, and the terminal apparatus may change the starting point in the whole piece of music according to this instruction, then the corresponding music fragment is acquired by re-selecting from the whole piece of music according to the changed starting point, and the re-selected music fragment and the video are re-synthesized to obtain the target video. In this way, the user may either directly adopt the background music fragment of other users, or re-select the starting point of the whole piece of music to which the background music fragment belongs, so as to re-select the favorite music fragment and synthesize it into the video captured by himself/herself.

A certain video sharing software on a smart phone is taken as an example for explanation below.

Figure 3A:
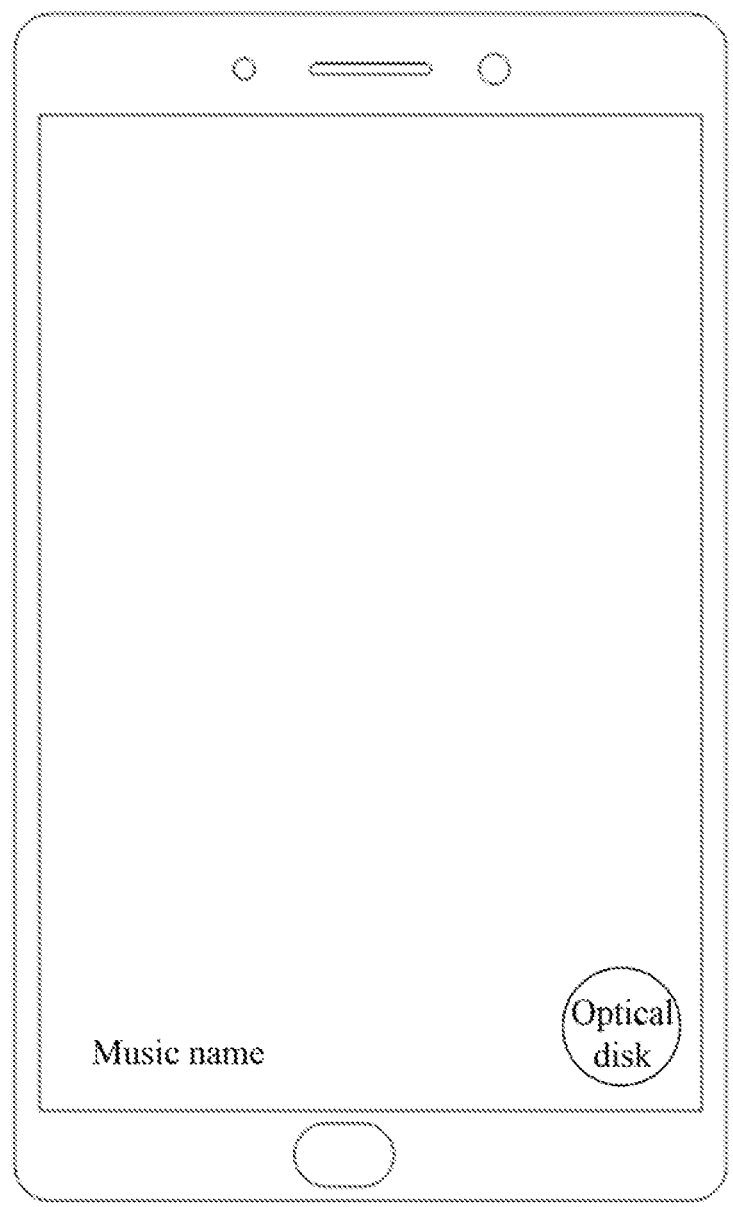
FIG. 3a is a schematic structural diagram of a video playing interface provided by an embodiment of the present disclosure.

As shown in FIG. 3a, a schematic structural diagram of a video playing interface is shown. The video playing interface may include a rotated optical disc control and a rolling music name. When a user triggers the optical disc control or the music name, a music viewing instruction is generated.

Figure 3B:
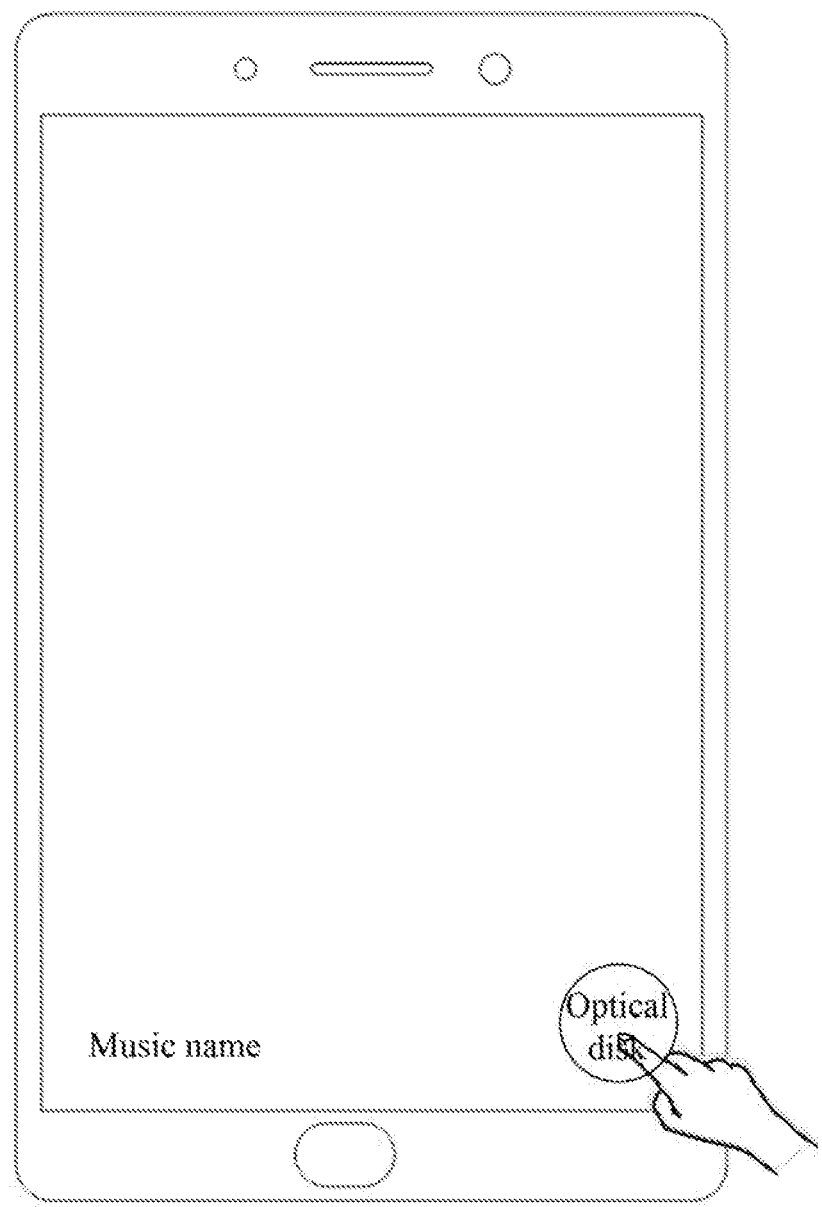
FIG. 3b is a schematic structural diagram of another video playing interface provided by an embodiment of the present disclosure.
Figure 3C:
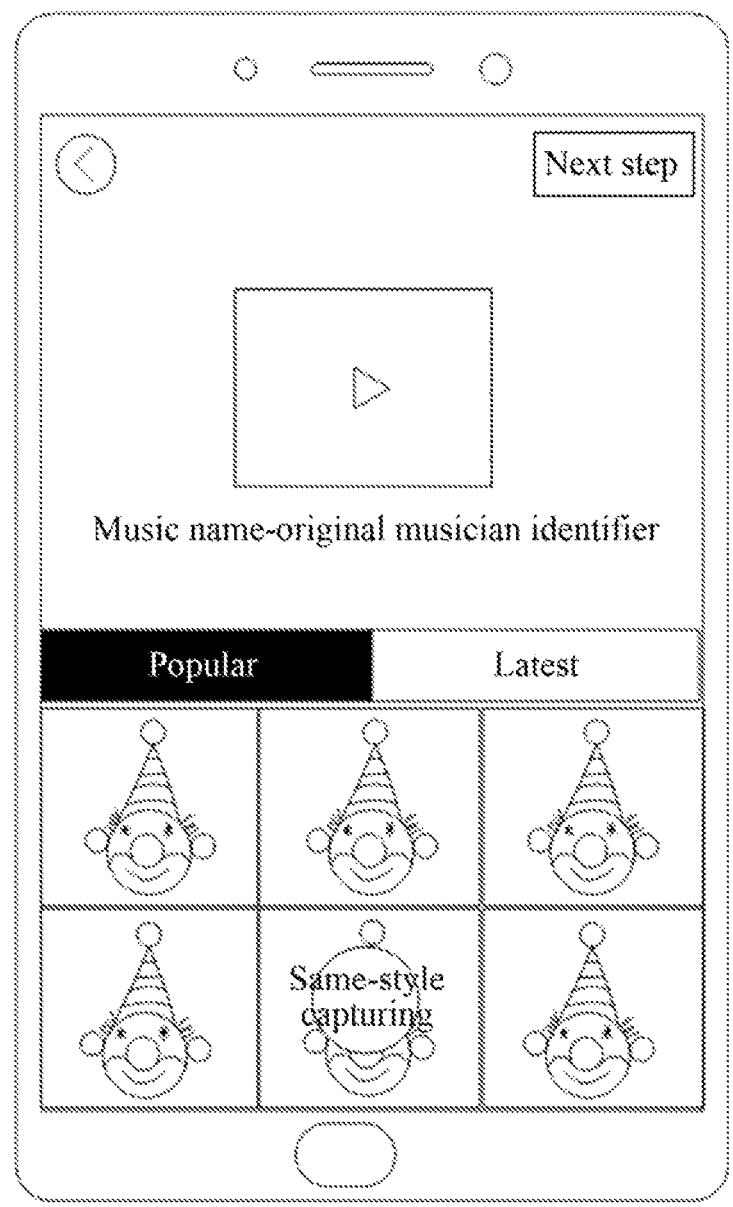
FIG. 3c is a schematic structural diagram of a music detail interface provided by an embodiment of the present disclosure.

As shown in FIG. 3b, the user triggers the optical disc control or the music name on the video playing interface to jump to a music detail interface as shown in FIG. 3c, on which the music name, the original musician identifier, and the cover of a video captured by using background music are displayed. The video captured by using the background music includes popular videos and latest videos. The music detail interface further includes a same-style capturing control.

Figure 3D:
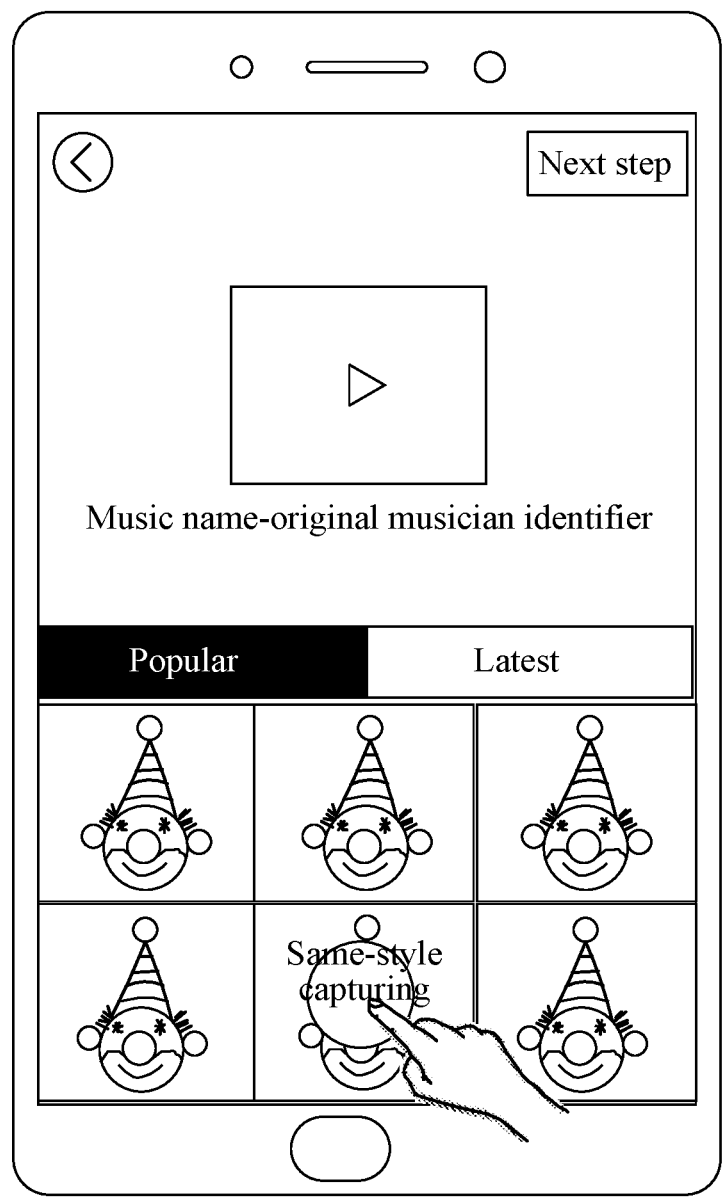
FIG. 3d is a schematic structural diagram of another music detail interface provided by an embodiment of the present disclosure.
Figure 3E:
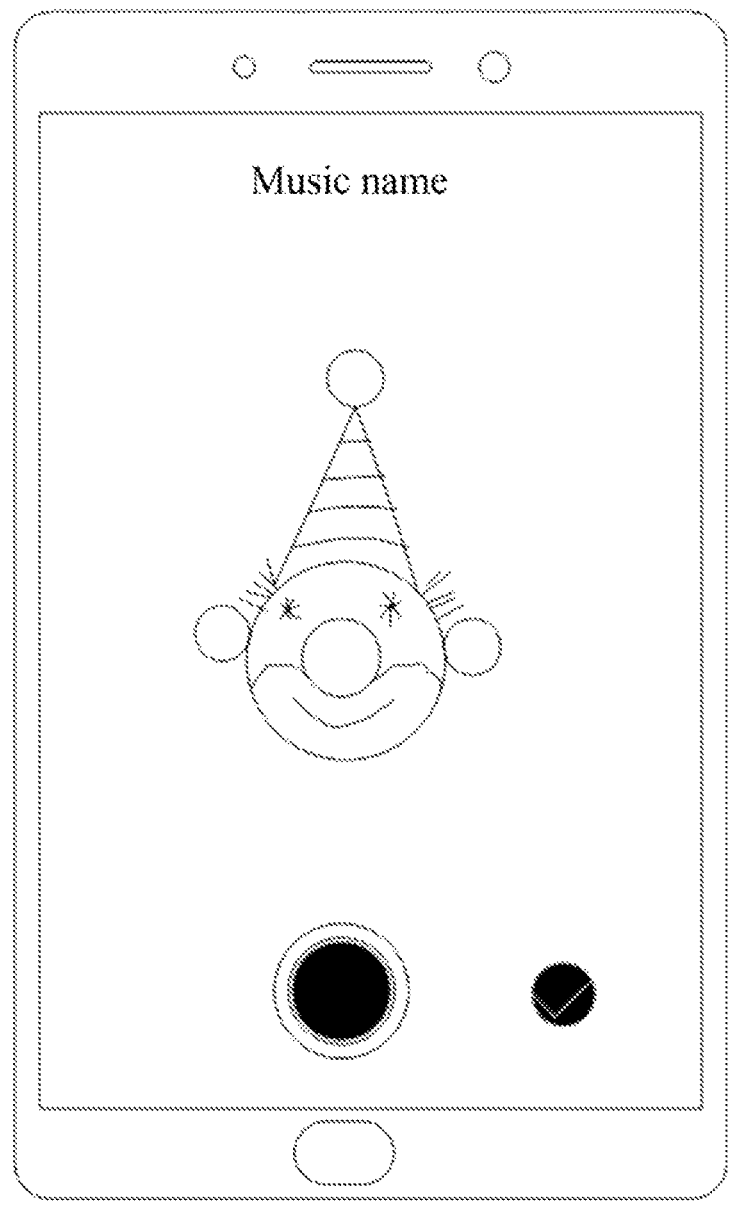
FIG. 3e is a schematic structural diagram of a video capturing interface provided by an embodiment of the present disclosure.

As shown in FIG. 3d, the user triggers the same-style capturing control to jump to a video capturing interface as shown in FIG. 3e. The video capturing interface includes a capturing control and a synthesis control.

Figure 3F:
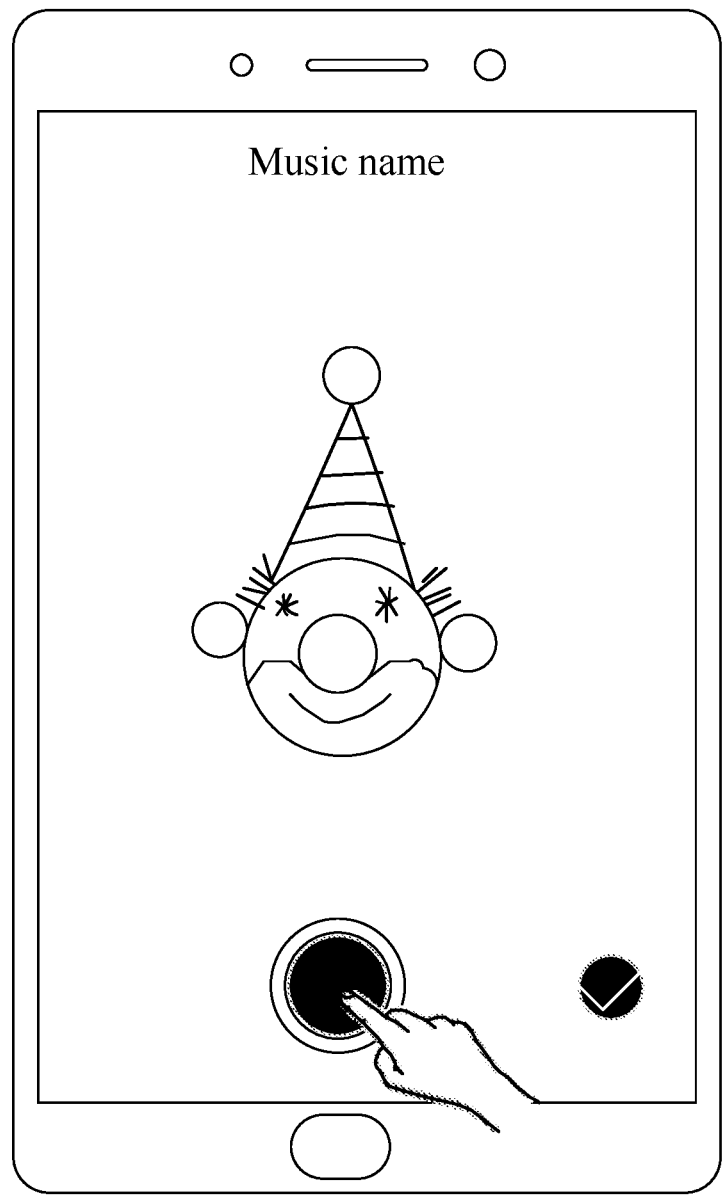
FIG. 3f is a schematic structural diagram of another video capturing interface provided by an embodiment of the present disclosure.
Figure 3G:
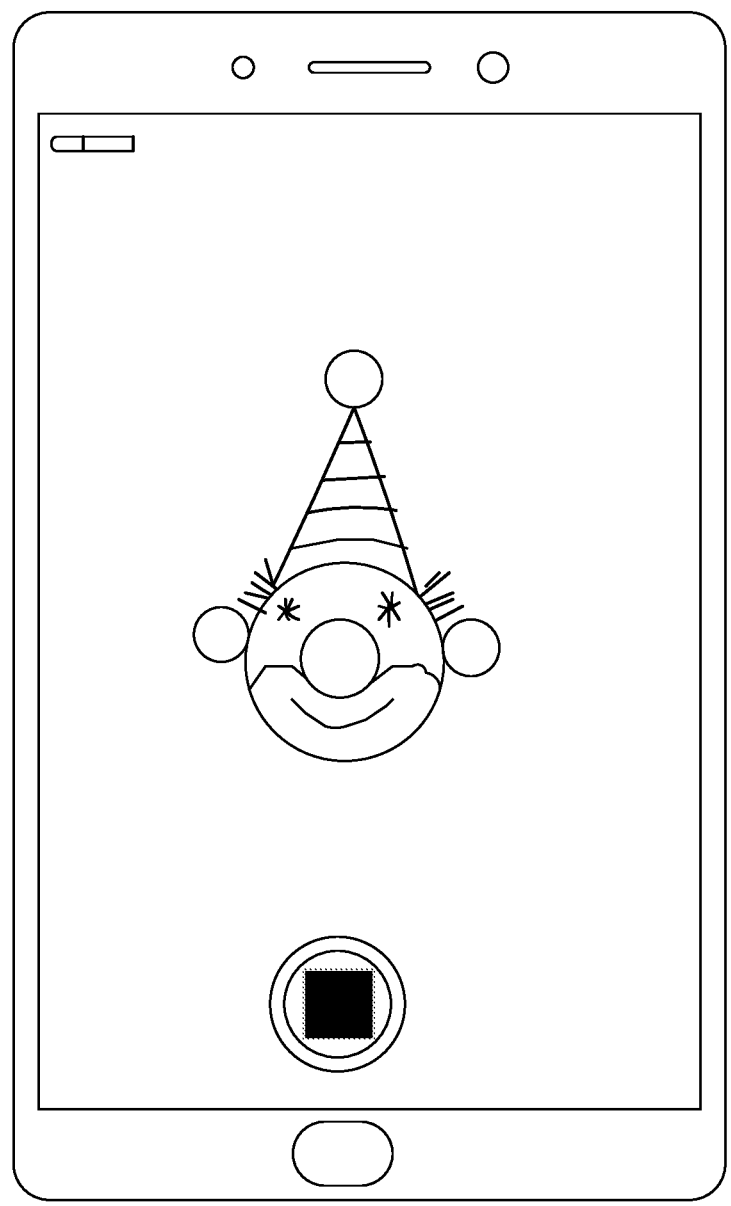
FIG. 3g is a schematic structural diagram of another video capturing interface provided by an embodiment of the present disclosure.

As shown in FIG. 3f, after the user triggers the capturing control, as shown in FIG. 3g, then a target scene and a capturing stop control are displayed on the video capturing interface, and a progress bar is displayed at an upper left corner of the video capturing interface until a trigger operation on the capturing stop control by the user is detected, then a corresponding video is stored.

Figure 3H:
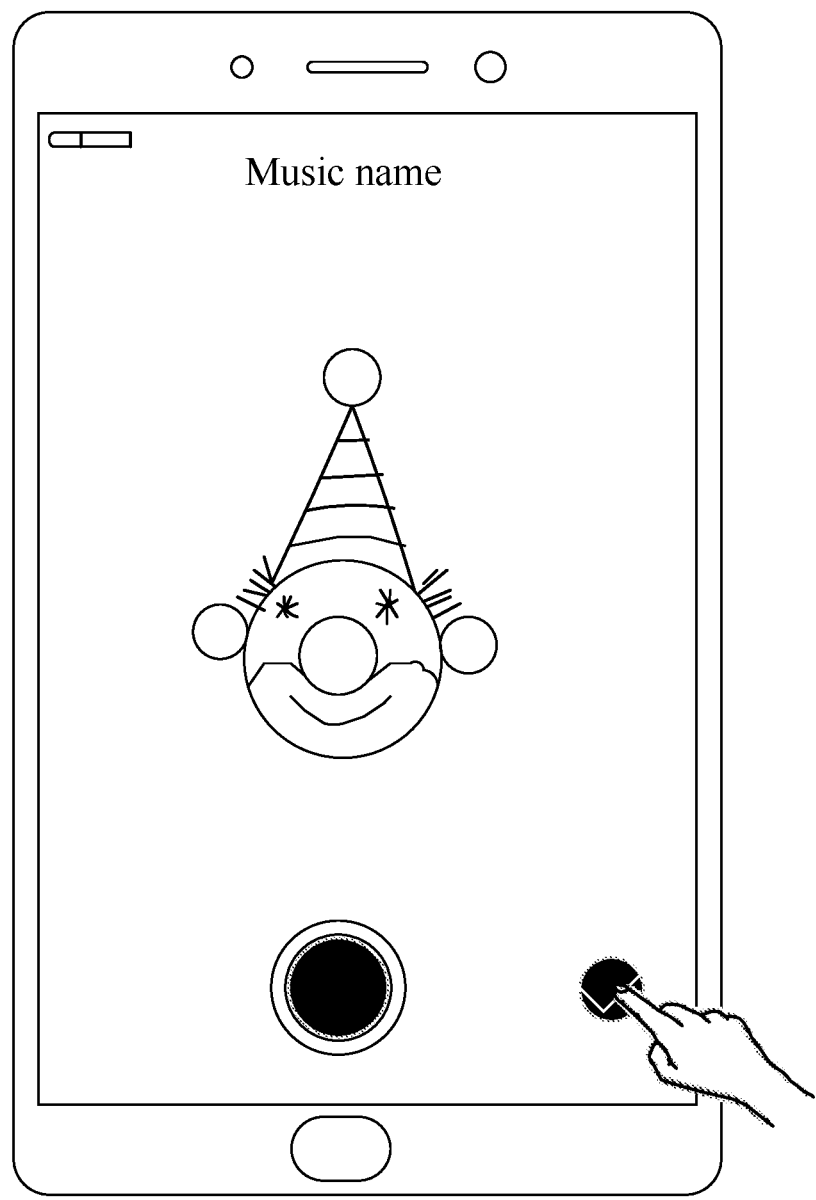
FIG. 3h is a schematic structural diagram of another video capturing interface provided by an embodiment of the present disclosure.
Figure 3I:
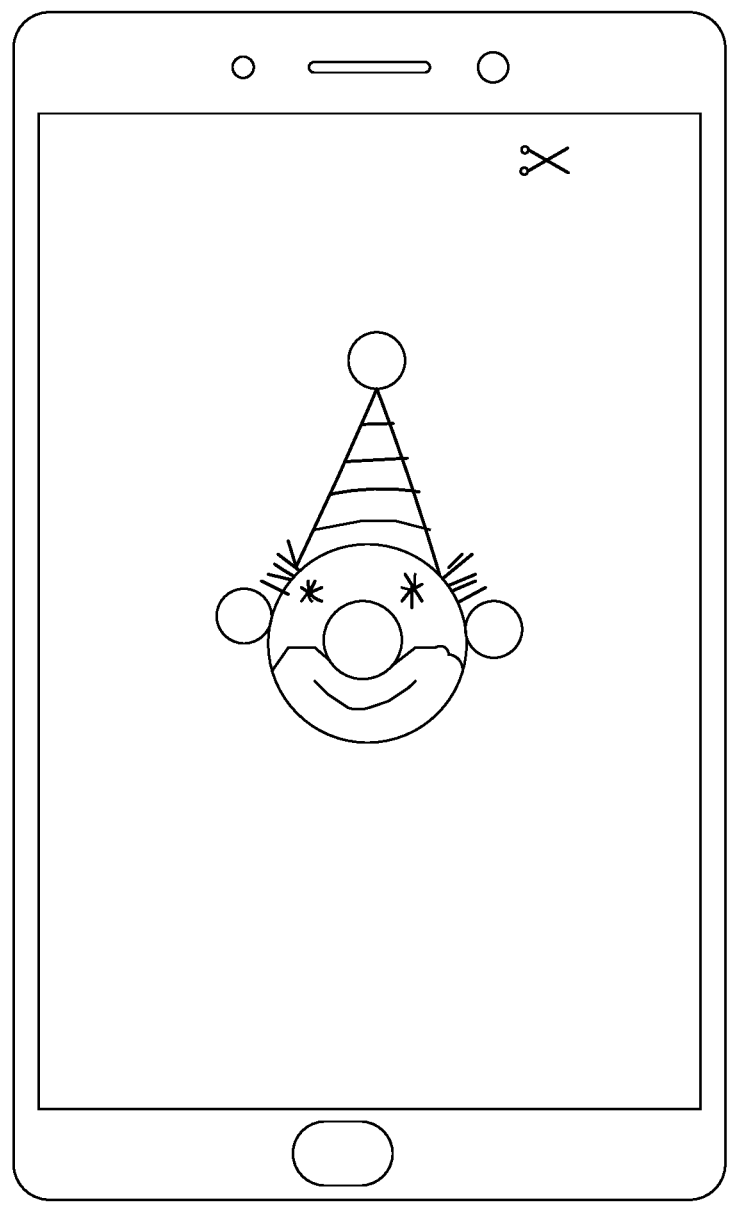
FIG. 3i is a schematic structural diagram of a video viewing interface provided by an embodiment of the present disclosure.

As shown in FIG. 3h, if the user triggers the synthesis control, then a corresponding music fragment is acquired by selecting from the whole piece of music according to the starting point, and it is jumped to the video viewing interface as shown in FIG. 3i, and a result of synthesizing the music segment and the video to obtain a target video is displayed on the video viewing interface. The video viewing interface includes a music clipping control.

Figure 3J:
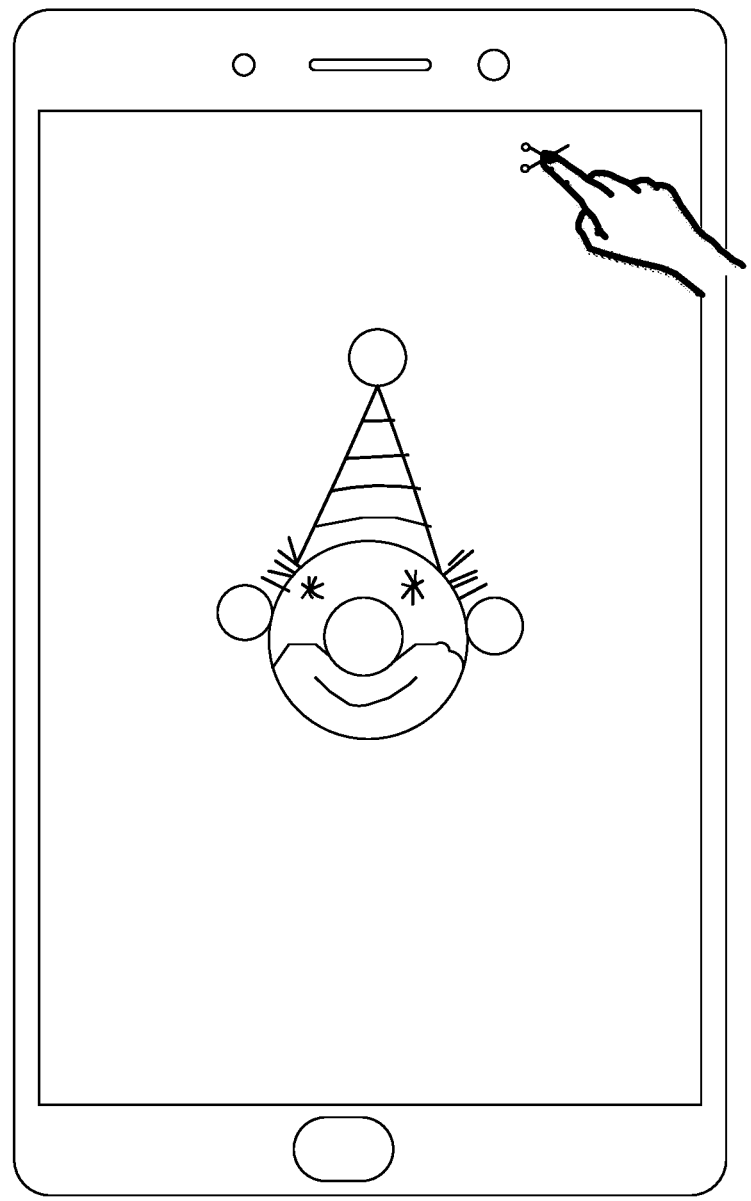
FIG. 3j is a schematic structural diagram of another video viewing interface provided by an embodiment of the present disclosure.
Figure 3K:
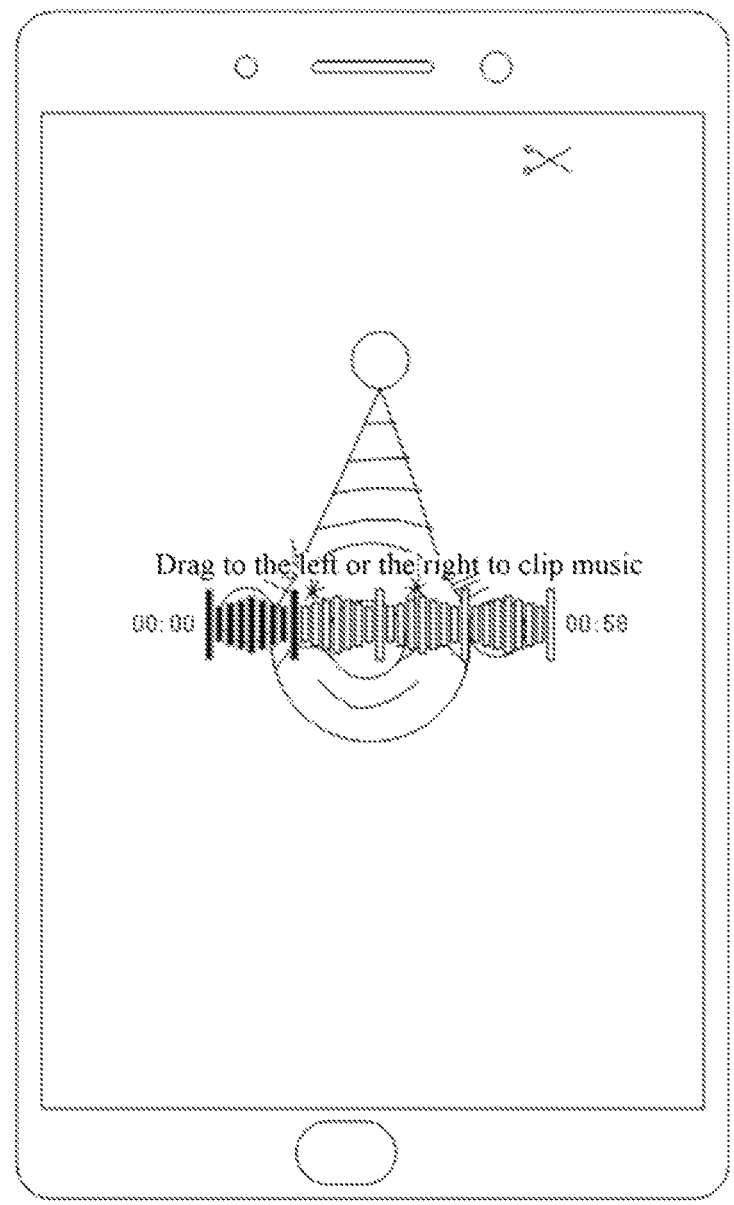
FIG. 3k is a schematic structural diagram of another video viewing interface provided by an embodiment of the present disclosure.

As shown in FIG. 3j, if the user triggers the music clipping control, as shown in FIG. 3k, the music progress bar is displayed on the video viewing interface.

Figure 3L:
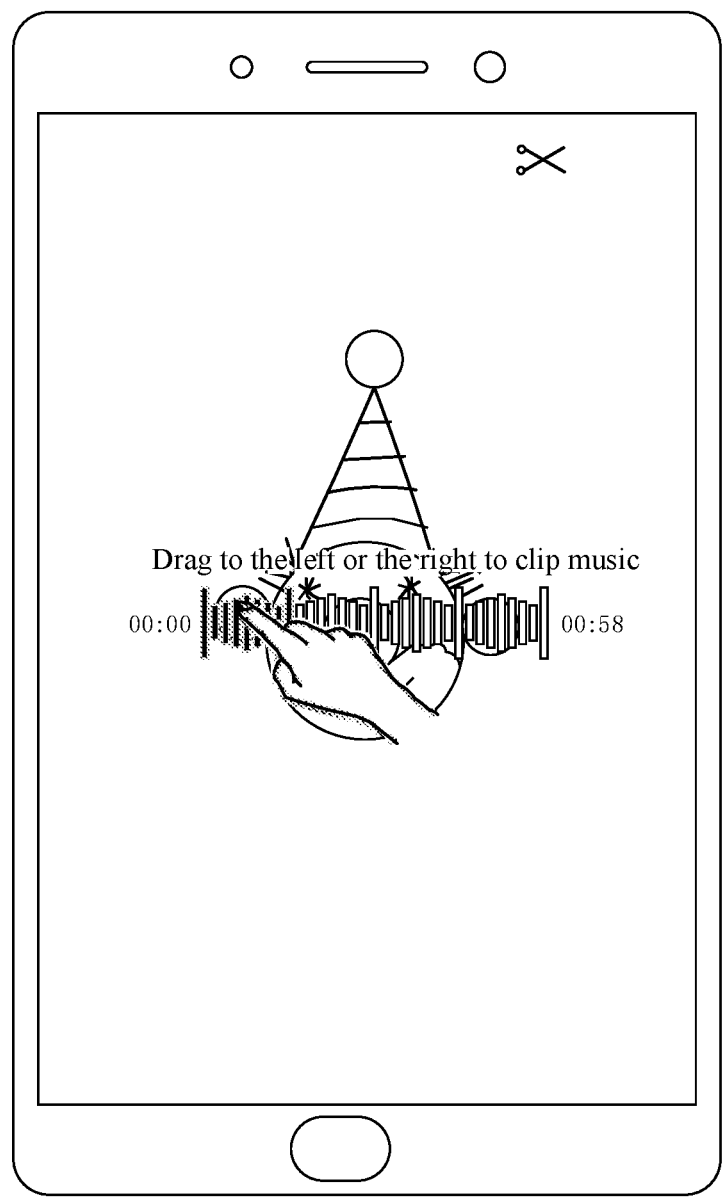
FIG. 3l is a schematic structural diagram of another video viewing interface provided by an embodiment of the present disclosure.

As shown in FIG. 3l, if a dragging operation on the music progress bar by the user is detected, the starting point in the whole piece of music is changed, it is re-selected from the whole piece of music according to the changed starting point to acquire the corresponding music fragment, and as shown in FIG. 3i, a result of re-synthesizing the re-selected music fragment and the video to obtain the target video is displayed on the video viewing interface. By this, a synthesis operation of the background music fragment of the video and a re-clipping processing operation of the background music fragment of the video are completed.

Figure 3M:
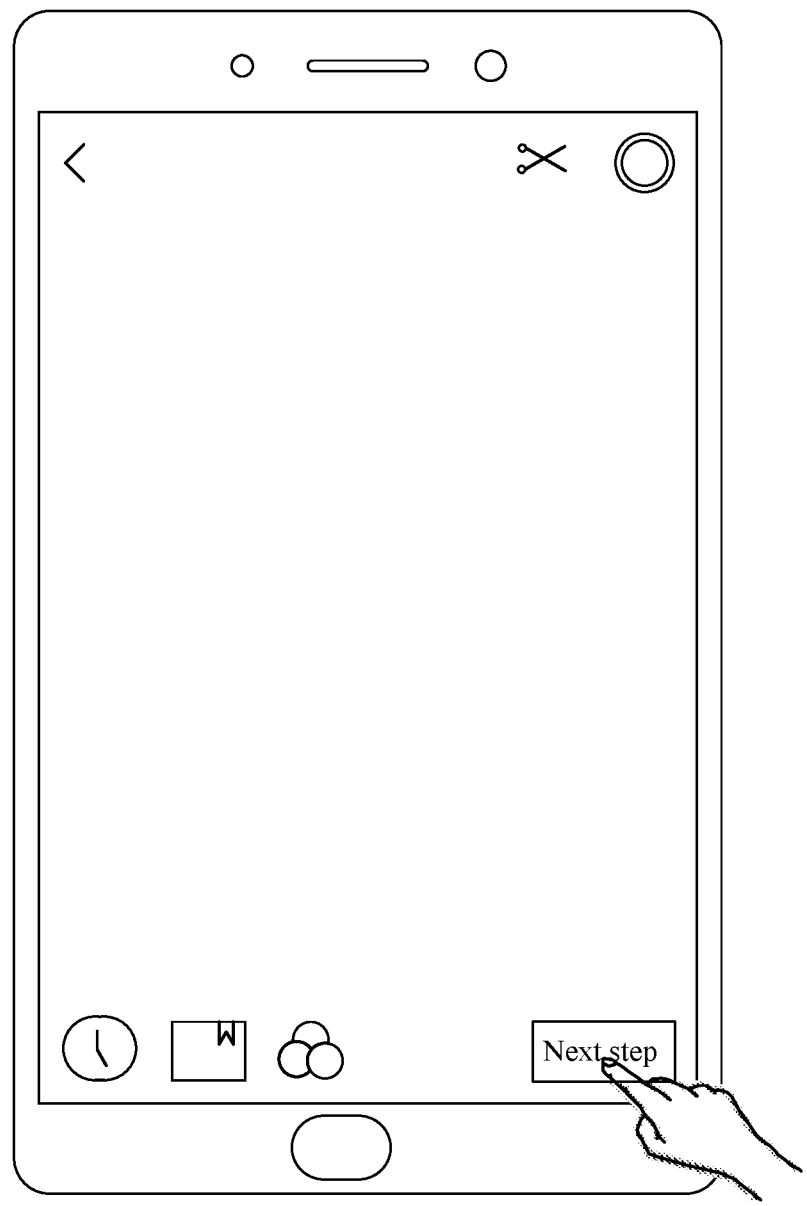
FIG. 3m is a schematic structural diagram of another video viewing interface provided by an embodiment of the present disclosure.
Figure 3N:
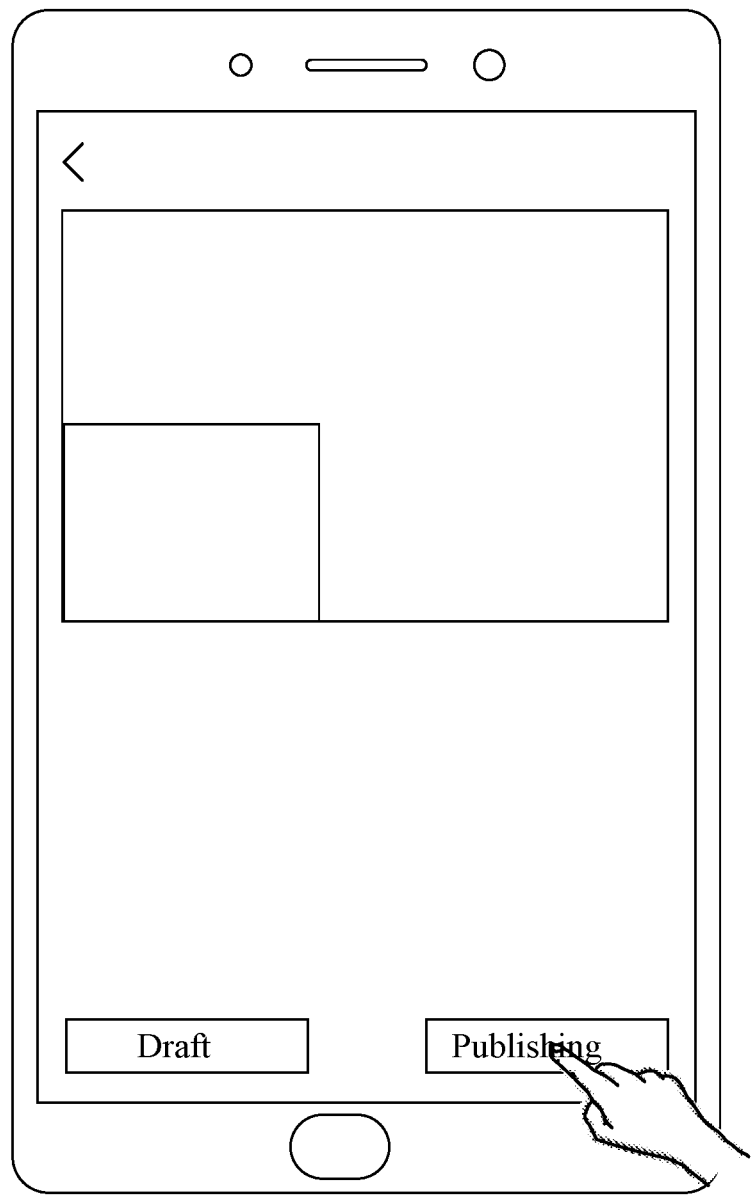
FIG. 3n is a schematic structural diagram of a video capturing storage interface provided by an embodiment of the present disclosure.
Figure 3O:
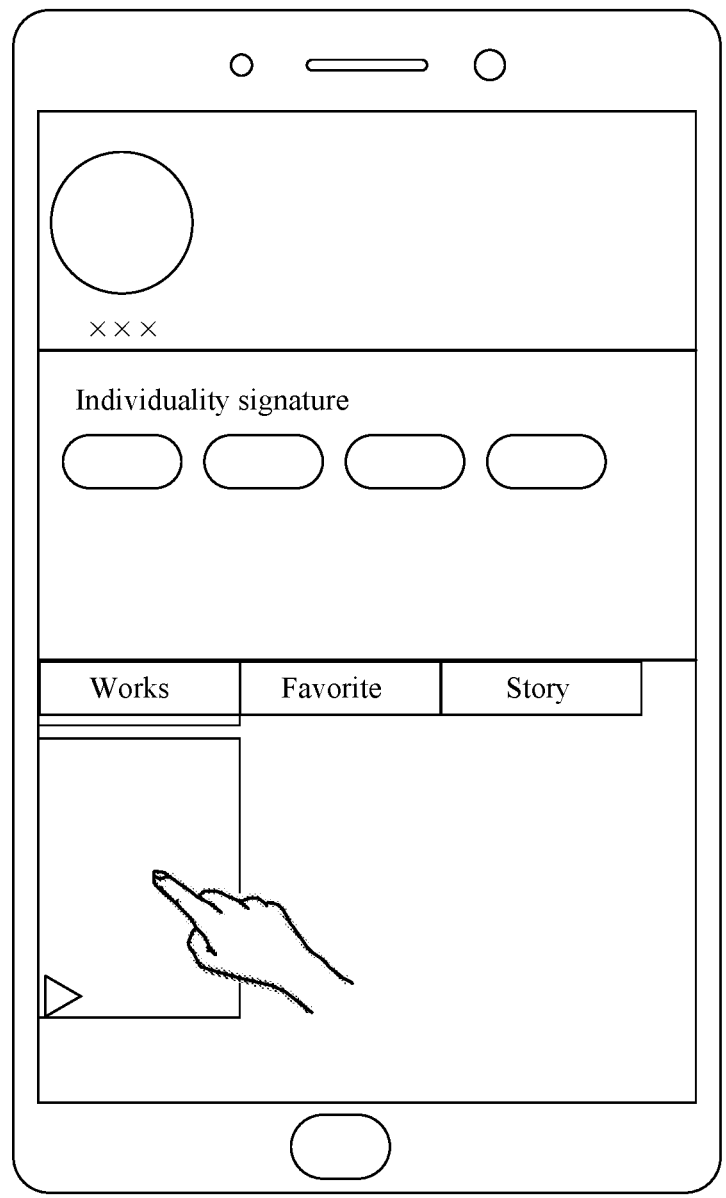
FIG. 3o is a schematic structural diagram of a user homepage interface provided by an embodiment of the present disclosure.
Figure 3P:
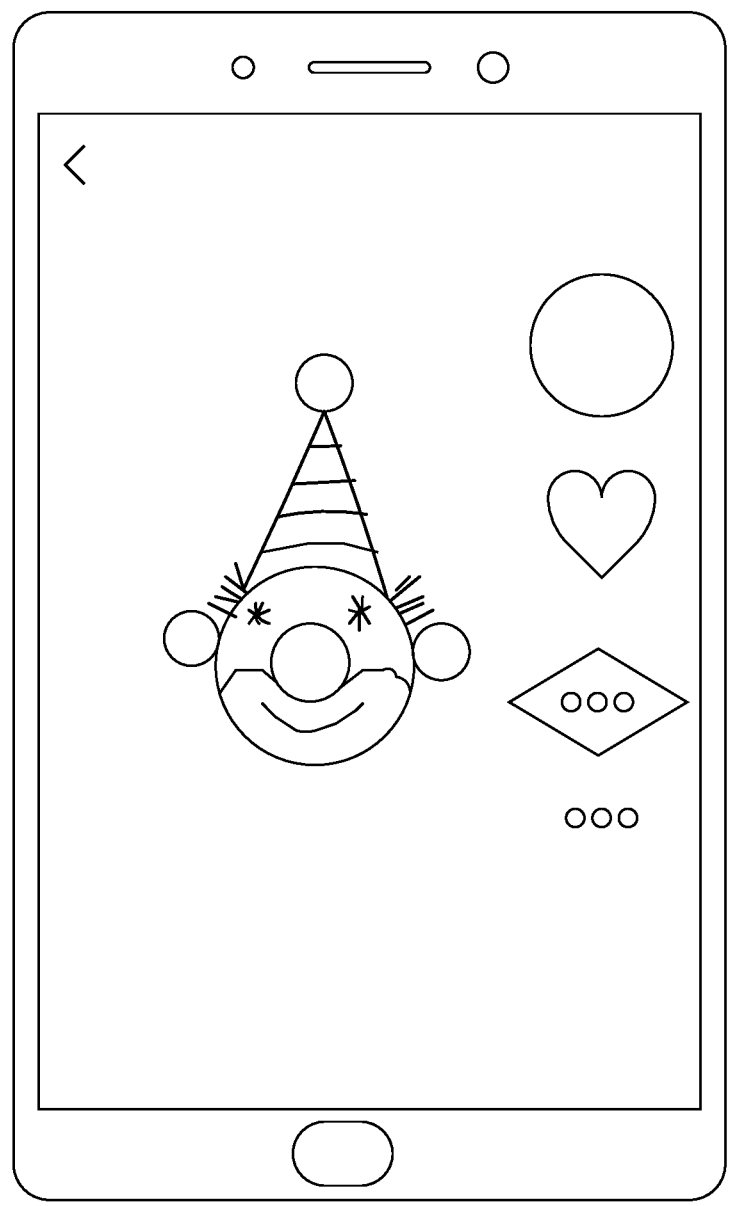
FIG. 3p is a schematic structural diagram of a video publishing interface provided by an embodiment of the present disclosure.

As shown in FIG. 3m, the user triggers a next step control on the video viewing interface to jump to a video capturing storage interface as shown in FIG. 3n. The video capturing storage interface may include a storage mode control (not shown in the figure). The storage mode control may include a draft box control and a publishing control. The user triggers the storage mode control to jump to a user homepage interface as shown in FIG. 3o. The user homepage interface may include a work control. The user triggers the work control to jump to the video publishing interface as shown in FIG. 3p, and the target video is played. In an embodiment, the video viewing interface may include a sharing control, a like control, a comment control and the like.

In the technical scheme of this embodiment, the music control provided on the video playing interface may be triggered to enter the music detail interface, the starting point of the background music fragment used by the video on the video playing interface is acquired in the whole piece of music, after the same-style capturing instruction is acquired on the music detail interface, the video capturing may be performed, and after the video capturing is completed, the corresponding music fragment is acquired according to the starting point, and the music fragment and the captured video are synthesized to obtain the target video, so that the user can conveniently capture a video by adopting the same-style music fragment used by the video on the video playing interface, the acquisition efficiency of the music information is improved, and thus the user experience is improved.

Figure 4:
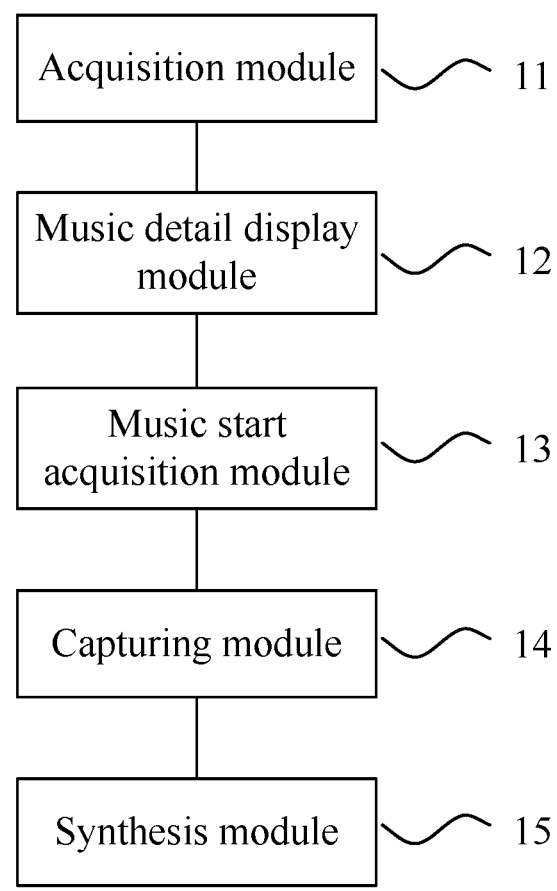
FIG. 4 is a schematic structural diagram of a device for selecting background music and capturing a video provided by an embodiment of the present disclosure.

FIG. 4 is a schematic structural diagram of a device for selecting background music and capturing a video provided by an embodiment of the present disclosure. The device includes an acquisition module 11, a music detail display module 12, a music start acquisition module 13, a capturing module 14 and a synthesis module 15. The acquisition module 11 is configured to acquire a music viewing instruction in a process of playing a video. The music detail display module 12 is configured to display a music detail corresponding to a background music fragment used by the played video according to the music viewing instruction. The music start acquisition module 13 is configured to acquire a same-style capturing instruction, and acquire a starting point of the background music fragment in a whole piece of music according to the same-style capturing instruction. The capturing module 14 is configured to acquire a capturing instruction, perform a video capturing on a target scene according to the capturing instruction until a capturing stop instruction is acquired, and acquire a corresponding video. The synthesis module 15 is configured to acquire a synthesis instruction, select from the whole piece of music according to the starting point to acquire a corresponding music fragment, and synthesize the music fragment and the acquired video to obtain a target video.

Figure 5:
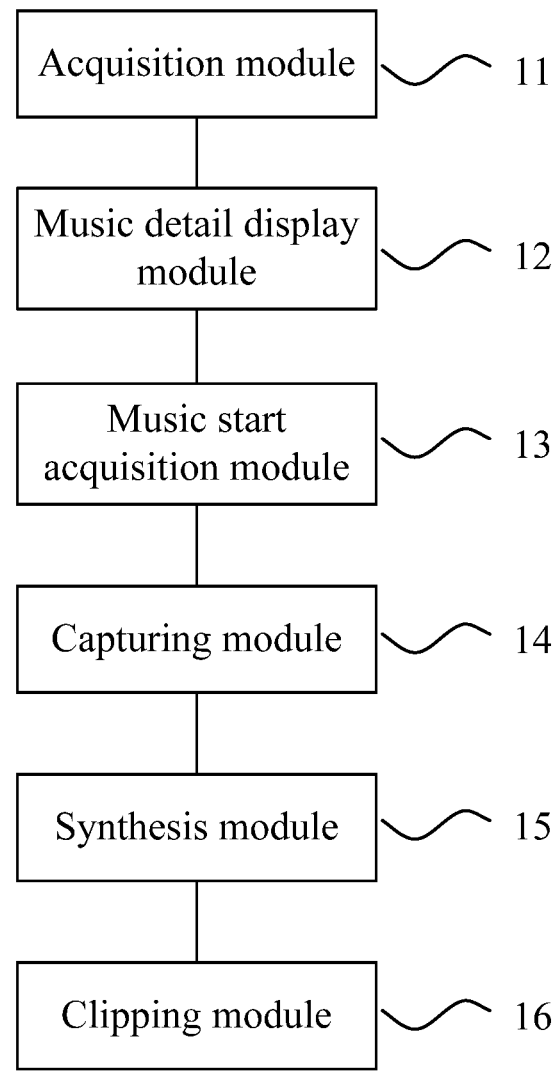
FIG. 5 is a schematic structural diagram of another device for selecting background music and capturing a video provided by an embodiment of the present disclosure.

On the basis of the above-described technical scheme, FIG. 5 is a schematic structural diagram of another device for selecting background music and capturing a video provided by an embodiment of the present disclosure. The device further includes a clipping module 16, which is configured to: acquire a music clipping instruction, change the starting point in the whole piece of music according to the music clipping instruction, re-select from the whole piece of music according to the changed starting point to acquire the corresponding music fragment, and re-synthesize the re-selected music fragment and the acquired video to obtain the target video.

On the basis of the above-described technical scheme, the music start acquisition module 13 is configured to: acquire, according to background music fragment information stored in the played video, the starting point of the background music fragment in the whole piece of music; or determine, through an acoustic spectrum comparison, the starting point of the background music fragment in the whole piece of music.

On the basis of the above-described technical scheme, the music detail includes a music name, an original musician identifier, and a cover of a video captured by using the background music fragment.

Figure 6:
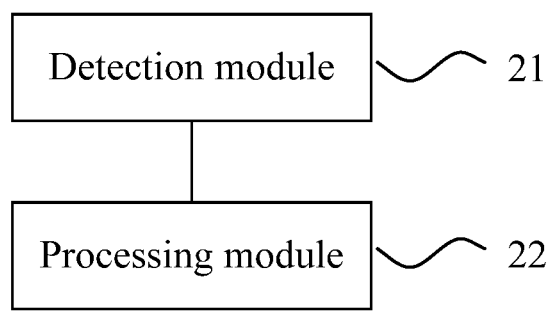
FIG. 6 is a schematic structural diagram of a device for selecting background music and capturing a video provided by an embodiment of the present disclosure.

FIG. 6 is a schematic structural diagram of another device for selecting background music and capturing a video provided by an embodiment of the present disclosure. The device includes a detection module 21 and a processing module 22. The detection module 21 is configured to detect a trigger operation on a music control on a video playing interface. The processing module 22 is configured to jump to a music detail interface, and display a same-style capturing control on the music detail interface. The detection module 21 is further configured to detect a trigger operation on the same-style capturing control. The processing module 22 is further configured to acquire a starting point of a background music fragment which is in a whole piece of music and used by a video on the video playing interface, jump to a video capturing interface, and display a capturing control and a synthesis control on the video capturing interface. The detection module 21 is further configured to detect a trigger operation on the capturing control. The processing module 22 is further configured to display a target scene on the video capturing interface and display a capturing stop control, and store a corresponding video until a trigger operation on the capturing stop control is detected. The detection module 21 is further configured to detect a trigger operation on the synthesis control. The processing module 22 is further configured to select from the whole piece of music according to the starting point to acquire a corresponding music fragment, jump to the video viewing interface, and display a result of synthesizing the music fragment with the stored video to obtain a target video.

On the basis of the above-described technical scheme, the processing module 22 is further configured to display a music clipping control on the video viewing interface; the detection module 21 is further configured to detect a trigger operation on the music clipping control; the processing module 22 is further configured to display a music progress bar on the video viewing interface; the detection module 21 is further configured to detect a dragging operation on the music progress bar; the processing module 22 is further configured to change the starting point in the whole piece of music, re-select from the whole piece of music according to the changed starting point to acquire the corresponding music fragment, and display, on the video viewing interface, a result of re-synthesizing the re-selected music fragment and the stored video to obtain the target video.

On the basis of the above-described technical scheme, the processing module 22 is further configured to further display a music name, an original musician identifier, and a cover of a video captured by using the background music fragment on the music detail interface.

The device for selecting the background music and capturing the video provided by the embodiments of the present disclosure may perform the method for selecting the background music and capturing the video provided by any embodiment of the present disclosure, and have corresponding functional modules for performing the method as well as the beneficial effects.

Figure 7:
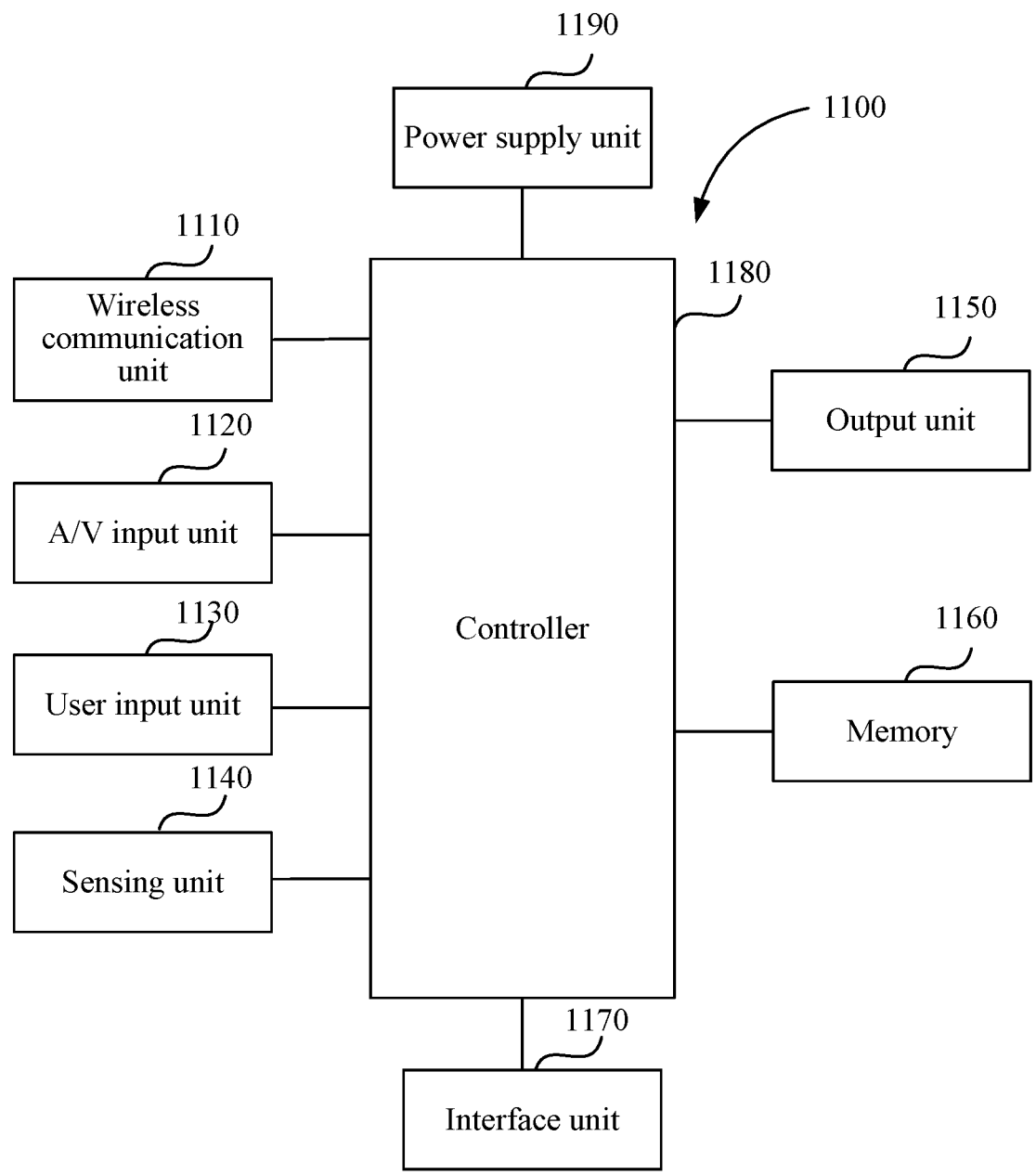
FIG. 7 is a schematic diagram of a hardware structure of a terminal apparatus provided by an embodiment of the present disclosure.

FIG. 7 is a schematic diagram of a hardware structure of a terminal apparatus provided by an embodiment of the present disclosure. The terminal apparatus may be implemented in a number of forms, the terminal apparatus in the present disclosure may include, but is not limited to, a mobile terminal apparatus such as a mobile phone, a smart phone, a notebook computer, a digital broadcast receiver, a personal digital assistant (PDA), a portable android device (PAD), a portable multimedia player (PMP), a navigation device, an in-vehicle terminal apparatus, an in-vehicle display terminal, an in-vehicle electronic rearview mirror, as well as fixed a terminal apparatus such as a television (TV) and a desktop computer.

As shown in FIG. 7, the terminal apparatus 1100 may include a wireless communication unit 1110, an audio/video (A/V) input unit 1120, a user input unit 1130, a sensing unit 1140, an output unit 1150, a memory 1160, an interface unit 1170, a controller 1180, a power supply unit 1190 and the like. FIG. 7 shows a terminal apparatus with various assemblies, but it is not required to implement all assemblies shown. Alternatively, more or fewer assemblies may be implemented.

In an embodiment, the wireless communication unit 1110 is configured to allow radio communications between the terminal apparatus 1100 and a wireless communication system or network. The A/V input unit 1120 is configured to receive audio or video signals. The user input unit 1130 may be configured to generate key input data according to a command inputted by a user so as to control various operations of the terminal apparatus. The sensing unit 1140 is configured to detect a current state of the terminal apparatus 1100, a position of the terminal apparatus 1100, a presence or an absence of a touch input of a user to the terminal apparatus 1100, an orientation of the terminal apparatus 1100, an accelerated or decelerated movement and direction of the terminal apparatus 1100, etc., and the sensing unit 1140 is configured to generate a command or signal for controlling an operation of the terminal apparatus 1100. The interface unit 1170 serves as an interface through which at least one external device may be connected to the terminal apparatus 1100. The output unit 1150 is configured to provide an output signal in a visual, audio and/or tactile manner. The memory 1160 may be configured to store a software program used for processing and controlling operations and executed by the controller 1180, etc., or may be configured to temporarily store data that has been output or will be output. The memory 1160 may include at least one type of storage medium. Moreover, the terminal apparatus 1100 may be configured to cooperate with a network storage device that performs the storage function of the memory 1160 through a network connection. The controller 1180 is configured to generally control an overall operation of the terminal apparatus. In addition, the controller 1180 may include a multimedia module configured to reproduce or play back multimedia data. The controller 1180 may be configured to perform a pattern recognition process to recognize a handwriting input or a picture drawing input performed on a touch screen as a character or an image. The power supply unit 1190 is configured to receive external power or internal power and provide appropriate power required to operate at least one element and assembly under the control of controller 1180. In an embodiment, the A/V input unit 1120 includes a camera configured to capture an image.

The processor 1180 is configured to execute at least one functional application as well as data processing by running a program stored in the memory 1160, for example, to implement the method for selecting the background music and capturing the video according to any embodiment of the present disclosure.

An embodiment of the present disclosure further provides a storage medium. The storage medium contains an executable instruction which, when executed by a controller, is configured to perform related operations in the method for selecting the background music and capturing the video provided by any embodiment of the present disclosure.

Those skilled in the art will appreciate from the above description of the embodiments that the embodiments of the present disclosure may be implemented by software and general purpose hardware, or may be implemented by hardware. Based on this understanding, the technical scheme of the embodiments of the present disclosure may be embodied in the form of a software product, and the computer software product may be stored in a computer readable storage medium, such as a floppy disk of a computer, a read-only memory (ROM), a random access memory (RAM), a flash memory (FLASH), a hard disk or an optical disk. The computer readable storage medium includes multiple instructions to enable a computer apparatus (which may be a personal computer, a server, a network device, or the like) to perform the method of any of the embodiments of the present disclosure.

In the embodiments of the above-described device, multiple units and modules included are only divided according to the function logic, but not limited to the above division, as long as the corresponding functions may be realized. In addition, the name of each functional unit is also merely to facilitate distinguishing from each other and is not intended to limit the protection scope of the embodiments of the present disclosure.

What is claimed is:

1. A method for selecting background music and capturing a video, comprising:
    acquiring a music viewing instruction in a process of playing a video;
    displaying a music detail corresponding to a background music fragment used by the played video according to the music viewing instruction;
    acquiring a starting point of the background music fragment in a whole piece of music;
    acquiring a capturing instruction, performing a video capturing on a target scene according to the capturing instruction until a capturing stop instruction is acquired, and acquiring a corresponding video; and
    acquiring a synthesis instruction, selecting from the whole piece of music according to the starting point to acquire a corresponding music fragment, and synthesizing the music fragment and the acquired video to obtain a target video using a same-style background music fragment as the played video.

2. The method of claim 1, wherein after synthesizing the music fragment and the acquired video to obtain the target video, the method further comprises:
    acquiring a music clipping instruction; and
    changing the starting point in the whole piece of music according to the music clipping instruction, re-selecting from the whole piece of music according to the changed starting point to acquire the corresponding music fragment, and re-synthesizing the re-selected music fragment with the acquired video to obtain the target video.

3. The method of claim 1, wherein acquiring the starting point of the background music fragment in the whole piece of music comprises:
    acquiring, according to background music fragment information stored in the played video, the starting point of the background music fragment in the whole piece of music; or
    determining, through an acoustic spectrum comparison, the starting point of the background music fragment in the whole piece of music.

4. The method of claim 1, wherein the music detail comprises a music name, an original musician identifier, and a cover of a video captured by using the background music fragment.

5. A method for selecting background music and capturing a video, comprising:
    in response to detecting a trigger operation on a music control on a video playing interface, jumping to a music detail interface, and displaying a same-style capturing control on the music detail interface, wherein a music detail corresponding to a background music fragment used by a played video is displayed on the music detail interface, and the same-style capturing control is used for capturing a target video using a same-style background music fragment as the played video; and
    in response to detecting a trigger operation on the same-style capturing control, performing operations comprising:
        acquiring, a starting point of the background music fragment which is in a whole piece of music, jumping to a video capturing interface, and displaying a capturing control and a synthesis control on the video capturing interface;
        in response to detecting a trigger operation on the capturing control, displaying a target scene on the video capturing interface and displaying a capturing stop control, and storing a corresponding video until a trigger operation on the capturing stop control is detected; and
        in response to detecting a trigger operation on the synthesis control, selecting from the whole piece of music according to the starting point to acquire a corresponding music fragment, jumping to a video viewing interface, and displaying a result of synthesizing the music fragment and the stored video to obtain the target video.

6. The method of claim 5, wherein after jumping to the video viewing interface, and displaying the result of synthesizing the music fragment and the stored video to obtain the target video, the method further comprises:
    displaying a music clipping control on the video viewing interface; and
    in response to detecting a trigger operation on the music clipping control, displaying a music progress bar on the video viewing interface; in response to detecting a dragging operation on the music progress bar, changing the starting point in the whole piece of music, re-selecting from the whole piece of music according to the changed starting point to acquire the corresponding music fragment, and displaying, on the video viewing interface, a result of re-synthesizing the re-selected music fragment and the stored video to obtain the target video.

7. The method of claim 5, wherein a music name, an original musician identifier, and a cover of a video captured by using the background music fragment are further displayed on the music detail interface.

8. A terminal apparatus, comprising a memory, a controller, and a program stored on the memory and executable on the controller, wherein the terminal apparatus further comprises a camera configured to collect a video, and the controller, when executing the program, is configured to perform:
    acquiring a music viewing instruction in a process of playing a video;
    displaying a music detail corresponding to a background music fragment used by the played video according to the music viewing instruction;
    acquiring a starting point of the background music fragment in a whole piece of music;
    acquiring a capturing instruction, performing a video capturing on a target scene according to the capturing instruction until a capturing stop instruction is acquired, and acquiring a corresponding video; and
    acquiring a synthesis instruction, selecting from the whole piece of music according to the starting point to acquire a corresponding music fragment, and synthesizing the music fragment and the acquired video to obtain a target video using a same-style background music fragment as the played video.

9. The terminal apparatus of claim 8, wherein after synthesizing the music fragment and the acquired video to obtain the target video, the controller is further configured to perform:
    acquiring a music clipping instruction; and
    changing the starting point in the whole piece of music according to the music clipping instruction, re-selecting from the whole piece of music according to the changed starting point to acquire the corresponding music fragment, and re-synthesizing the re-selected music fragment with the acquired video to obtain the target video.

10. The terminal apparatus of claim 8, wherein the controller is configured to perform acquiring the starting point of the background music fragment in the whole piece of music by:

acquiring, according to background music fragment information stored in the played video, the starting point of the background music fragment in the whole piece of music; or determining, through an acoustic spectrum comparison, the starting point of the background music fragment in the whole piece of music.

11. The terminal apparatus of claim 8, wherein the music detail comprises a music name, an original musician identifier, and a cover of a video captured by using the background music fragment.

12. A terminal apparatus, comprising a memory, a controller, and a program stored on the memory and executable on the controller, wherein the terminal apparatus further comprises a camera configured to collect a video, and the controller, when executing the program, performs the method for selecting the background music and capturing the video of claim 5.

13. The terminal apparatus of claim 12, wherein after jumping to the video viewing interface, and displaying the result of synthesizing the music fragment and the stored video to obtain the target video, the controller further performs:

displaying a music clipping control on the video viewing interface; and in response to detecting a trigger operation on the music clipping control, displaying a music progress bar on the video viewing interface; in response to detecting a dragging operation on the music progress bar, changing the starting point in the whole piece of music, re-selecting from the whole piece of music according to the changed starting point to acquire the corresponding music fragment, and displaying, on the video viewing interface, a result of re-synthesizing the re-selected music fragment and the stored video to obtain the target video.

14. The terminal apparatus of claim 12, wherein a music name, an original musician identifier, and a cover of a video captured by using the background music fragment are further displayed on the music detail interface.

15. A non-transitory computer readable storage medium, containing an executable instruction which, when executed by a controller, performs the method for selecting the background music and capturing the video of claim 1.

16. A non-transitory computer readable storage medium, wherein the executable instruction, when executed by the controller, performs the method for selecting the background music and capturing the video of claim 2.

17. A non-transitory computer readable storage medium, wherein the executable instruction, when executed by the controller, performs the method for selecting the background music and capturing the video of claim 3.

18. The non-transitory computer readable storage medium of claim 15, wherein the music detail comprises a music name, an original musician identifier, and a cover of a video captured by using the background music fragment.

19. A non-transitory computer readable storage medium, containing an executable instruction which, when executed by a controller, performs the method for selecting the background music and capturing the video of claim 5.

20. A non-transitory computer readable storage medium, wherein the executable instruction, when executed by the controller, performs the method for selecting the background music and capturing the video of claim 6.

* * * * *